United States Patent [19]

Stone

[11] Patent Number: 4,698,572
[45] Date of Patent: Oct. 6, 1987

[54] KINEMATIC PARAMETER IDENTIFICATION FOR ROBOTIC MANIPULATORS

[75] Inventor: Henry W. Stone, Pittsburgh, Pa.

[73] Assignee: Westinghouse Electric Corp., Pittsburgh, Pa.

[21] Appl. No.: 848,437

[22] Filed: Apr. 4, 1986

[51] Int. Cl.$^4$ .......................... B25J 1/02; G05B 1/06
[52] U.S. Cl. .................................... 318/568; 318/567; 901/14; 901/15
[58] Field of Search ............... 318/568, 570, 571, 574, 318/576, 577, 569, 568 E, 568 M, 568 G, 568 F, 567, 640; 364/169, 513, 723; 901/3, 4, 14, 15, 16, 17, 18, 29, 32, 46

[56] References Cited

U.S. PATENT DOCUMENTS

| | | | |
|---|---|---|---|
| 3,888,362 | 6/1975 | Fletcher et al. | 318/640 X |
| 4,062,455 | 12/1977 | Flatau | 901/15 X |
| 4,068,156 | 1/1978 | Johnson et al. | 318/575 |
| 4,467,436 | 8/1984 | Chance et al. | 364/513 |
| 4,529,921 | 7/1985 | Moribe | 318/567 X |
| 4,555,217 | 11/1985 | Wright | 901/14 X |
| 4,575,802 | 3/1986 | Walsh et al. | 364/513 |
| 4,585,387 | 4/1986 | Jayne | 901/15 X |
| 4,604,561 | 8/1986 | Kamajima et al. | 318/567 |
| 4,604,716 | 8/1986 | Kato et al. | 364/513 |

OTHER PUBLICATIONS

Chen, J., Wang, C. B., and Yang, C. S.; Robot Positioning Accuracy Improvement through Kinematic Parameter Identification. In Proceedings of the Third Canadian CAD/CAM in Robotics Conference, pp. 4.7–4.12. Jun., 1984. Toronto, Canada.

Denavit, J. and Hartenberg, R. S. A Kinematic Notation for Lower-Pair Mechanisms Based on Matrices. Journal of Applied Mechanics 77(2):215–221, Jun., 1955.

Mooring, B. W. and Tang, G. R. An improved Method for Identifying the Kinematic Parameters in a Six Axis Robot. In Booktitle, pp. 79–84, 1985.

Ranky, P. G. Test Method and Software for Robot Qualification. The Industrial Robot 11(2):111–115, Jun., 1984.

Whitney, D. E., and Lozinski, C. A. Industrial Robot Calibration Methods and Results. In Proceedings of the International Conference on Computers in Engineering. ASME, Aug. 1984. Las Vegas, NV.

*Primary Examiner*—Bernard Roskoski
*Assistant Examiner*—Shik Luen Paul Ip
*Attorney, Agent, or Firm*—R. Studebaker

[57] ABSTRACT

A method and apparatus for kinematic parameter identification of an industrial manipulator having either revolute or prismatic joints. The identification of individual kinematic parameters is called the arm signature of a robot. Through the identification and detailed measurement of mechanical features in a robot, kinematic features, i.e. the planes of rotation and centers of rotation for revolute joints and lines of translation for prismatic joints are identified. These three features contain the essential information to formulate a complete robot kinematic model.

6 Claims, 5 Drawing Figures

KINEMATIC PARAMETER IDENTIFICATION FOR ROBOTIC MANIPULATORS

BACKGROUND OF THE INVENTION

1. Field of the Invention

The invention is directed to a technique for improving the kinematic performance of robotic manipulators. More particularly, this invention provides a novel technique to accurately and efficiently identify the actual kinematic parameters of any manipulator and thus improve and reduce the variability in the kinematic performance of robotic manipulators.

2. Description of the Prior Art

A primary objective in the control of robotic manipulators is the accurate positioning and orientation of the end effector and cartesian space. It is the task of the robot kinematic controller to transform the desired end-effector cartesian trajectories into equivalent joint trajectories. The joint trajectories are the reference inputs to the joint servo systems which drive the joints to the desired positions. Thus, the input to a kinematic controller is a series of desired end-effector cartesian positions and orientations and the output is a corresponding series of joint positions. To perform the transformation, the kinematic controller must evaluate the inverse kinematic equations for each discrete cartesian location in both position and orientation. The inverse kinematic equations are derived from a parametric model of the relationship between the robot end-effector cartesian location and the joint positions. This model is called the "forward kinematics" of the robot. The parameters of the forward kinematic model described the spatial relationship between the lengths of the robot and are defined via the principles of geometry.

It is the conventional process in the robotic industry, to use kinematic parameters in the design and implementation of robot controllers. These kinematic parameters are obtained from the mechanical drawings generated through manufacturing specifications of the robot. The advantage of this approach is that it leads to relatively simple, closed-form control algorithms. The disadvantage, however, is that this approach implicitly assumes that the errors incurred during the manufacture of a robot are negligible. The actual kinematic structure of a robot will, in part, be a function of these manufacturing errors. Since manufacturing errors are random, each manipulator possesses unique kinematics and the positioning performance of these robots degrades significantly when there is a mismatch between the actual robot and the model which implements the kinematic control. While the manufacturing errors may be small, i.e. on the order of thousandths of an inch and hundredths of a degree, they can have a significant impact upon kinematic manipulator performance. Clearly then, manipulator performance degrades as the mismatch between the ideal kinematic parameters used in the design of the controller and the actual robot kinematic parameters increases. This mismatch is especially prevalent in manipulators with revolute joints in which small manufacturing errors produce significant errors between the actual and predicted positions and orientations of the end effector. There has been a long-standing need in the industry to develop practical methods for identifying the actual kinematic models of n that's degree of freedom robotic manipulators in order to improve their kinematic performance. Such models, whose parameters are estimates of the unique kinematic parameters, are known as "arm signatures". Once identified, the arm signature of an individual robot can be used to synthesize and implement control algorithms to improve kinematic performance.

Kinematic parameter identification algorithms have been proposed in the literature. Attention is directed to the following articles:

*Robot Positioning Accuracy Improvement Through Kinematic Parameter Identification,* Chen, J. et al., Proceedings of the Third Canadian CAD/CAM in Robotics Conference, June 1984;

*An Improved Method For Identifying The Kinematic Parameters In A Sixth Axis Robot,* Mooring, B. W. et al., in Book Title, pages 79–84, 1985; and

*Industrial Robot Calibration Methods And Results,* Whitney, D. E. et al., in the Proceedings of the International Conference on Computers and Engineering, ASME, August 1984.

The contents of these articles is incorporated by reference as is fully set forth herein.

It is therefore an object of the present invention to provide a method for improving and reducing the variability in the kinetic performance of robotic manipulators.

It is also an object of this invention to provide a technique for the accurate and efficient identification of the actual kinematic parameters of an industrial manipulator. This manipulator can have either revolute or prismatic joints.

SUMMARY OF THE INVENTION

The invention provides an apparatus and a method for the identification of kinematic parameters of a manipulator having at least one revolute joint or one prismatic joint through which controlled movement of the manipulator is effected and which controlled movement defines a work envelope of the manipulator. According to this method, a cartesian coordinate reference frame is defined and contains a predetermined working volume. The manipulator of interest is positioned in a fixed location relative to the coordinate reference frame so that the work envelope of the manipulator is contained within the predetermined working volume of the cartesian coordinate reference frame. A target is established on the manipulator relative to one link of the manipulator so that incremental movement of the joint causes the synchronous movement of the target within the cartesian coordinate reference frame working volume. The cartesian position of the target for each of a plurality of incremental movements is measured. The resultant locus of measured cartesian positions defines a circle centered about an axis of rotation on a plane perpendicular to the axis of rotation for a revolute joint, on a line parallel to the axis of translation for a prismatic joint. The center of the circle lies on the revolute joint axis of rotation. A vector which is normal to the plane on which the circle lies is defined. This vector is parallel to the axis of rotation.

The invention provides for the formulation of a new mathematical model of robot forward kinematics called the S-Model. This model specifically provides a method by which to solve the kinematic parameter identification problem. All manipulators exhibit a combination of three mechanical features which inherently define the kinematic structure of the robot. These features can be readily identified through the method and apparatus of this invention. The three mechanical features, hereinafter referred to as the kinematic features are the (1) planes of rotation and centers of rotation for revolute joint, and lines of translation for prismatic joints.

The underlying principle of this identification technique is to first identify a robot's kinematic features and then apply the identified feature parameters to determine the parameters of the S-Model. The S-Model can be applied either to directly control the robot or to determine the kinematic parameters of other kinematic models.

The plane of rotation and center of rotation are features of a revolute joint. The locus of a point rotating about an axis is a circle lying in a plane. The normal to this plane is a vector which is parallel to the axis of rotation. Furthermore, the center of the circle is a point which lies on the axis of rotation. These two geometrical properties are the plane of rotation and center of rotation features. When joint $i-1$ of a manipulator is rotated, any point which is fixed relative to the $i^{th}$ link defines a plane or rotation and a center of rotation. This assumes that the positions of joints 1 through $i-2$ remain fixed. The plane of rotation and center of rotation are associated with the $(i-1)^{th}$ joint and the $i^{th}$ link.

The line of translation is a feature of a prismatic joint. When a point is displaced linearily, its trajectory is a straight line which is parallel to the vector which indicates the direction of the displacement. For a manipulator, any point which is fixed relative to link i defines the line of translation when joint $i-1$ is actuated. This again assumes that the positions of joint 1 through $i-2$ remain fixed.

Through this invention, a set of kinematic features can be envisioned by observing a robotic manipulator. Two features for each revolute joint, and one feature for each prismatic joint. As the robot'configuration is changed, the relative positions and orientations of these features will change. The relative movements are governed by the geometric structure of the robot. The three features contain the essential information to formulate a complete robot kinematic model. These three features can be readily identified from measurements of the cartesian position of target points mounted on each of a robot's links.

The present invention provides the unique advantage of not requiring orientational measurements. The exact location of the targets on the links is relatively arbitrary. This eliminates the need for elaborate fixturing devices as was common in the literature. In addition, the sensor system used to obtain the target position measurements is independent of the manipulator. The manipulator need only to be placed within the working volume of the cartesian coordinate frame of reference defined by the sensors.

BRIEF DESCRIPTION OF THE DRAWINGS

The above as well as other features of the present invention can be more clearly appreciated through the consideration of the detailed description of the invention in conjunction with the several figures in which.

DETAILED DESCRIPTION OF THE INVENTION

The invention provides a method and apparatus for the identification of the kinematic parameters of a robotic manipulator. In order to fully appreciate the purpose and function of the "S-Model" of this invention it is necessary to first review standard robotic notation and the Denavet-Hartenberg Model of Parameters for a revolute joint.

Uppercase boldface letters (e.g., $T_i$ and $S_i$) denote (4×4) homogeneous transformation matrices. These matrices describe the relative position and orientation of two cartesian coordinate systems. Uppercase script letters (e.g., $\mathcal{T}_i$ and $\mathcal{S}_i$) denote the symbolic name of a cartesian coordinate system. Lowercase letters (e.g., $d_i$ and $\beta_i$) denote scalar parameters.

The Denavit-Hartenberg Model

In the robotics literature, the (4×4) homogeneous transformation matrix $$T_n = A_1 \bullet A_2 \bullet \ldots \bullet A_n \quad (1)$$

defines the position and orientation of a coordinate frame fixed relative to the last link ($n^{th}$ link) of a manipulator with respect to a coordinate frame fixed relative to the base of the manipulator. The Denavit-Hartenberg link coordinate frames, $T_i$ for $i = 1, \ldots, n$, are specified so that the forward transformation matrices $A_i$ are prescribed by $$A_i = Rot(z, \theta_i) Trans(O, O, d_i) Trans(a_i, O, O) Rot(x, a_i). \quad (2)$$

Figure 1:
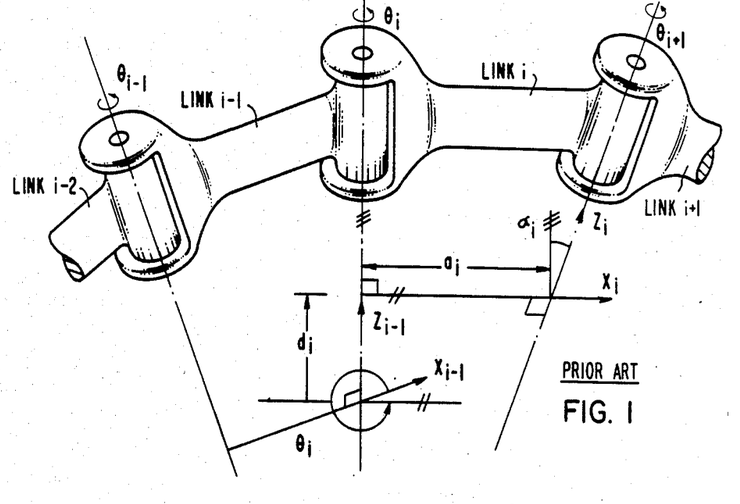
FIG. 1 is a schematical representation of the Denavit-Hartenberg parameters for a revolute joint.

In (2), $A_i$, which is the transformation from coordinate frame $T_{i-1}$ to coordinate frame $T_i$, is a function of the four Denavit-Hartenberg parameters, $\theta_i$, $d_i$, $a_i$, and $\alpha_i$. An n degree-of-freedom manipulator requires the specification of 4•n parameters. The parameters $a_i$ and $\alpha_i$ are the link length and twist, respectively. The parameters $\theta_i$ and $d_i$ are offsets or joint positions depending upon whether the $i^{th}$ joint is revolute or prismatic. In FIG. 1, there is illustrated the geometric interpretation of the Denavit-Hartenberg parameters $\theta_i$, $d_i$, $a_i$, and $\alpha_i$ for a revolute joint. For the companion illustration of the Denavit-Hartenberg parameters for a prismatic joint, attention is directed to "Robot Manipulators: Mathematics, Programming and Control", R. P. Paul, MIT Press, Cambridge, MA, 1981; the contents of what are incorporated by reference.

The characteristics of the Denavit-Hartenberg model are immediate consequences of the Denavit-Hartenberg convention applied to specify the link coordinate frames. The Denavit-Hartenberg convention follows from a geometrical analysis of the spatial relationships between consecutive joint axes. Knowledge of the position and orientation of the joint axes is thus fundamental to the kinematic modeling of manipulators. For the development of the present S-Model it is useful to review the link coordinate frame assignments according to the Denavit-Hartenberg convention:

The Z axis of coordinate frame $\mathcal{T}_{i-1}$ must be parallel to the joint i axis;

The origin of coordinate frame $T_{i-1}$ must lie on the joint i axis at the intersection point of the common normal between the joint i−1 and joint i axes, and the joint i axis;

The X axis of coordinate frame $T_{i-1}$ must be parallel to the common normal between the joint i−1 and joint i axes. The positive direction of the X axis points towards the joint i axis;

The Y axis of coordinate frame $T_{i-1}$ is defined by the vector cross product of the Z axis unit direction vector with the X axis unit direction vector;

If the joint i and joint i+1 axes intersect, the point of intersection is the origin of the $T_{i-1}$ coordinate frame;

If the joint i and joint i+1 axes are parallel the origin of the coordinate frame, $T_{i-1}$ is chosen so that the joint distance $d_{i+1}$ for the next link is equal to zero;

The origin of the base link coordinate frame $T_0$, coincides with the origin of the link 1 coordinate frame $T_1$; and The origin of the last coordinate frame $T_n$, coincides with the origin of the next to last coordinate frame $T_{n-1}$.

These assignments guarantee the functional form of the Denavit-Hartenberg model in (1).

For a revolute joint, $\theta_i$ is the joint i position, and the three parameters, $d_i$, $a_i$, and $\alpha_i$ are constants. For a prismatic joint, $d_i$ is the joint i position, and the three parameters $\theta_i$, $a_i$, and $\alpha_i$ are constants. Manipulator joint encoders are calibrated to ensure that the encoder outputs match the Denavit-Hartenberg joint positions (i.e., $\theta_i$ for a revolute joint and $d_i$ for a prismatic joint). Without this calibration, constant offsets must be introduced to specify the difference between the joint positions measured by the encoder and the joint positions defined by the Denavit-Hartenberg model. When all of the joint positions are zero, it is said that the manipulator is in the Denavit-Hartenberg Zero Configuration.

The S-Model

Like the Denavit-Hartenberg model, the S-Model is a completely general method for describing and characterizing kinematics of robotic manipulators. In the S-Model, the matrix $$S_n = B_1 \bullet B_2 \bullet \ldots \bullet B_n \qquad (3)$$

defines the position and orientation of a coordinate frame fixed relative to the last ($n^{th}$) link of a manipulator with respect to a coordinate frame fixed relative to the base link. The general transformation matrices $B_i$ in (3) are (4×4) homogeneous transformation matrices. The $B_i$ and $S_n$ matrices in (3) are analogous to the $A_i$ and $T_n$ matrices of the Denavit-Hartenberg model in (1). The symbolic name $S_i$ signifies the $i^{th}$ link coordinate frame defined by the S-Model. The transformation matrix $B_i$ describes the relative transformation between the $S_{i-1}$ and $S_i$ coordinate frames (measured with respect to the $S_{i-1}$ coordinate frame). In the S-Model, six parameters $\beta_i$, $\bar{d}_i$, $\bar{a}_i$, $\bar{\alpha}_i$, $\gamma_i$, and $b_i$ define the transformation matrix $$B_i = Rot(z,\beta_i)Trans(O,O,d_i)Trans(a_i,O,O)Rot(x,\alpha_i)\text{-}Rot(z,\gamma_i)Trans(O,O,b_i). \qquad (4)$$

To specify the S-Model for an n degree-of-freedom manipulator thus requires 6•n parameters.

To ensure that the kinematics of the manipulator can be modeled by (3), an S-Model convention is introduced to define the allowable locations of the link coordinate frames. Because each joint is specified by six parameters, the S-Model convention is less restrictive than the Denavit-Hartenberg convention.

The following four assignments which are a subset of the Denavit-Hartenberg convention, specify the locations of the S-Model link coordinate frames:

The Z axis of the link coordinate frame $S_{i-1}$ must be parallel to the joint i axis in the direction defined by the positive sense of the rotation or translation of the $i^{th}$ joint;

The origin of the coordinate frame $S_{i-1}$ must lie on the joint i axis;

The Z axis of the last coordinate frame $S_n$ is parallel to the Z axis of the next to last coordinate frame $S_{n-1}$; and The origin of the last coordinate frame $S_n$ lies on the joint n−1 axis.

There are two fundamental distinctions between the Denavit-Hartenberg link coordinate frame $T_i$ and the S-Model link coordinate frame $S_i$. First, in contrast to the origin of $T_i$, the location of the origin of $S_i$ on the joint i+1 axis is aritrary. Second, the direction of the X axis of $S_i$ must only be orthogonal to the Z axis. The arbitrary location of the origin of $F_i$ along the joint axis and the arbitrary orientation of the X axis of $S_i$ provide an infinite number of link coordinate frames $S_o$ through $S_n$ which satisfy the S-Model convention.

Figure 3:
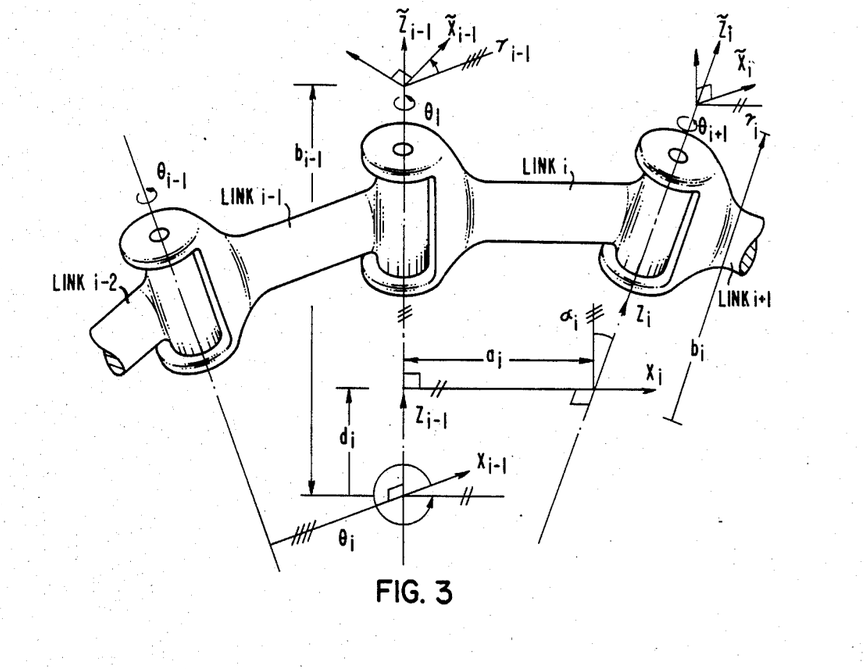
FIG. 3 is a schematic representation of the "S-Model" of this invention for the measurement of kinematic parameters.

The transformation matrix $B_i$ can be formulated from the geometry of FIG. 3, where the S-Model convention is applied to define a pair of link coordinate frames $S_{i-1}$ and $S_i$. For comparison, the Denavit-Hartenberg coordinate frames $T_{i-1}$ and $T_i$ are also depicted. The angle $\gamma_i$ is defined as the angular displacement between the X axes of the Denavit-Hartenberg coordinate frame $T_i$ and the S-Model coordinate frame $S_i$. The parameter $b_i$ is defined as the linear displacement between the origins of the Denavit-Hartenberg coordinate frame $T_i$ and the S-Model link coordinate frame $S_i$. ($\gamma_i$ is positive if the displacement is in the direction of the Z axis of joint i.)

Figure 2:
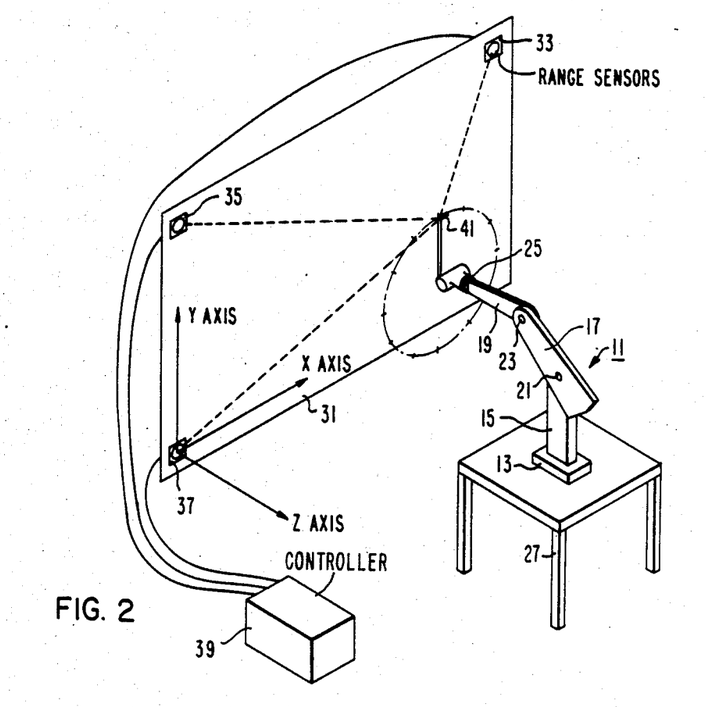
FIG. 2 is a schematical representation of a Puma 600 Robot and an independent sensor system illustrating the technique whereby the kinematic parameters of the manipulator can be established.

The transformation matrix $B_i$ specifies the spatial transformation between the $S_{i-1}$ and $S_i$ link coordinate frames for both prismatic and revolute joints. From FIG. 2 and the definitions of $\gamma_i$, $b_i$, $A_i$, the transformation matrix $B_i$ is the product $$B_i = Rot(z, -\gamma_{i-1})Trans(O,O, -b_{i-1})[Rot(z,\theta_i) \qquad (5)$$

$$Trans(O,O,d_i)Trans(a_i,O,O)$$

$$Rot(x,\alpha_i)]Rot(z,\gamma_i)Trans(O,O,b_i).$$

The first transformation, $Rot(z,-\gamma_{i-1})$, aligns the orientation of the axes of coordinate frames $S_{i-1}$ and $T_{i-1}$. The second transformation, $Trans(O,O,-b_i)$, translates the origin of $S_{i-1}$ so that it coincides with the origin of the Denavit-Hartenberg coordinate frame $T_{i-1}$. The four bracketed transformations in (5) define the Denavit-Hartenberg matrix $A_i$. (The parameters $\theta_i$, $d_i$, $a_i$, and $\alpha_i$ are the Denavit-Hartenberg parameters for link i.) These four matrices transform coordinate frame $T_{i-1}$ to the Denavit-Hartenberg coordinate frame $T_i$. In analogy with the first two transformations, the cascade $Rot(z,\gamma_i)Trans(O,O,b_i)$ transforms the Denavit-Hartenberg coordinate frame $T_i$ to the S-Model link coordinate frame $S_i$.

Upon applying the properties of homogeneous transformations [6], $B_i$ in (5) simplifies to $$B_i = Rot(z, \theta_i - \gamma_{i-1}) Trans(O, O, d_i - b_{i-1}) \quad (6)$$

$$Trans(a_i, O, O) Rot(x, \alpha_i)$$

$$Rot(z, -\gamma_i) Trans(O, O, b_i).$$

Since (4) and (5) are equivalent, $$\beta_i = \theta_i - \gamma_{i-1} \quad (7)$$

$$\bar{d}_i = d_i - b_{i-1} \quad (8)$$

where the joint rotational offset $\gamma_i$ and the joint translational offset $b_i$ are constant parameters.

If joint i is revolute, $\beta_i$ is a function of the joint position $\theta_i$ and the remaining five parameters $\bar{d}_i$, $\bar{a}_i$, $\bar{\alpha}_i$, $\gamma_i$, and $b_i$ are constants. If joint i is prismatic, $\bar{d}_i$ is a function of the joint position $d_i$ and the remaining five parameters $\beta_i$, $\bar{a}_i$, $\bar{\alpha}_i$, $\gamma_i$, and $b_i$ are constants. The four Denavit-Hartenberg parameters are extracted from the six S-Model parameters according to $$\theta_i = \beta i + \gamma_{i-1} \quad (9)$$

$$d_i = \bar{d}_i + b_{i-1} \quad (10)$$

$$a_i = \bar{a}_i \quad (11)$$

$$\alpha_i = \bar{\alpha}_i. \quad (12)$$

The next section applies the following properties of the S-Model in (3) to develop a kinematic identification algorithm:

The flexibility in assigning link coordinate frames (which leads to a simple, efficient, and accurate algorithm for identifying the location of the S-Model link coordinate frames $S_i$ for $i = 0, \ldots, n-1$); and The ability to extract the Denavit-Hartenberg model parameters from the S-Model parameters according to (9)-(12).

Kinematic Identification

The objective of S-Model Identification is to estimate the Denavit-Hartenberg kinematic parameters defined implicitly by three mechanical features (centers-of-rotation and planes-of-rotation for revolute joints, and lines-of-translation for prismatic joints). The locus of a point rotating about an axis is a circle lying in a plane. The normal to this plane is a vector which is parallel to the axis-of-rotation. Furthermore, the center of the circle is a point which lies on the axis-of-rotation. These two geometrical properteis are the plane-of-rotation and center-of-rotation features. When the joint $i-1$ of a manipulator is rotated, any point which is fixed relative to the $i^{th}$ link defines a plane-of-rotation and a center-of-rotation (under the assumption that the positions of joints 1 through $i-2$ remain fixed). The plane-of-rotation and center-of-rotation are associated with the $(i-1)^{th}$ joint and the $i^{th}$ link.

The line-of-translation is a feature of a prismatic joint. When a point is displaced linearly, its trajectory is a straight line which is parallel to the vector which indicates the direction of the displacement. For a manipulator, any point which is fixed relative to link i defines a line-of-translation when joint $i-1$ is actuated (under the assumption that the positions of joints 1 through $i-2$ remain fixed). These three features contain the essential information to formulate a complete kinematic model of a manipulator. Identification of these features is the first step in the S-Model identification algorithm.

Our S-Model identification algorithm proceeds through four steps:
Feature identification;
Specification of the link coordinate frames;
Computation of the S-Model parameters and
Extraction of the Denavit-Hartenberg parameters.

Feature Identification

Recursive least-squares [3] are applied to identify the three manipulator features. We estimate and reference the parameters which describe the position and orientation of the planes, points, and lines to a single coordinate frame, called the sensor frame, which must remain fixed relative to the base of the manipulator. Our systematic approach for collecting the measurement data ensures that the identified features correspond to a fixed configuration of the manipulator which we define to be the signature configuration. The signature configuration is specified by the n measured joint positions $q_l^s$ for $l = 1, 2, \ldots, n$. For expository convenience, we describe only the identification of the features of a revolute joint.

Identifying a plane-of-rotation and center-of-rotation is straightforward. Imagine a target point fixed relative to link $i+1$. When revolute joint i is rotated, this target point traces a circle in space. The plane in which the circle lies is the plane-of-rotation, which is defined by the coefficients of the equation for the plane. The center of the traced circle, defined by its three-dimensional cartesian coordinates, is the center-of-rotation. In practice, the point may be a physical location on the $i+1^{st}$ link or a location of a point on a body which is attached rigidly to link $i+1$. The only constraint is that the cartesian position of the target can be measured by the sensor system which must remain fixed relative to the base of the manipulator throughout the identification procedure.

As illustrated in FIG. 2, a robot with several revolute joints is generally indicated by the reference character 11 and includes a base 13, a first link 15, a second link 17, and a third link 19. The robot 11 also includes revolute joints 21, 23 and 25. A three dimensional cartensian range sensor is generally indicated by the reference character 31 and includes at least three sensor means 33, 35 and 37 which provide an output to a controller means 39. The range sensor 31 is in a fixed position relative to the base 13 of the robot 11, shown here to be supported on a table means 27. A suitable sensor system is available from Science Accessories Corp. of Southport, CT, and portions of which are described in U.S. Pat. No. 3,626,483, the contents of which are incorporated by reference herein. A target 41 is shown mounted on a bracket 43 which is fixed to revolute joint 25 whereby incremental movement of the joint 25 effects the synchronous movement of the target 41 relative to the link 19. The links and joints of the robot 11 between the revolute joint 25 which is being incrementally rotated and the base 13 are maintained in a fixed position relative to the base 13. The target is moved from the joint 25 to the next closest joint, in this case, joint 23, one joint at a time back toward the base 13. All of the joints between the joint for which measurements are taken and the base remain fixed during the measurement procedure. While the target 41 is shown on the bracket 43, the target can be located on the robot itself.

The coefficients of the plane are estimated from a recursive least-squares regression of m measured cartesian positions of the target along the circle. A natural criterion for plane-of-rotation parameter estimation is to minimize the sum of the squared normal errors between the measured positions and the estimated plane. While this estimate requires the solution of a nonlinear minimization problem, we have developed a sequential linear least-squares algorithm to approximate the solution. In practice, increasing m decreases the error in the estimated coefficients. Our approach leads to a robust algorithm which computes the coefficients ($a_1$, $a_2$, $a_3$) of the plane $$z = a_1 x + a_2 y + a_3. \quad (13)$$

To estimate the position of the center of the traced circle, the measured target positions are first projected normally onto the estimated plane-of-rotation. The projected data are then transformed to a coordinate frame whose X-Y plane is parallel to the estimated plane-of-rotation. After projection and transformation, the Z coordinates of the data equal a constant. The X and Y components of the data are then used to compute the coefficients ($a_1$, $a_2$, $a_3$) of the circle $$w = a_1 x + a_2 y + a_3 \quad (14)$$

where w is the sum-of-squares of the X and Y components of the data.

The X and Y coordinates of the center of the circle are computed from the parameters $a_1$, $a_2$, and $a_3$. The computed center of the circle is then transformed to the sensor coordinate frame by the inverse of the initial coordinate transformation. The coordinates of the center of the circle, which define the center-of-rotation for joint i, are noted by $\bar{p}_{i,c} = [x_{i,o}, y_{i,o}, z_{i,c}]^T$.

Constructing $\bar{S}_i$

In the second step, we apply the identified features of specify the location of the S-Model link coordinate frames which satisfy the S-Model convention (in Section 2.3). We compute the matrices $$\bar{S}_i = \bar{P} \bullet S_i \text{ for } i = 0, \ldots, n \quad (15)$$

to define the positions and orientations of the S-Model link coordinate frames with respect to the sensor coordinate frame. In (15), P is a constant homogeneous transformation matrix representing the spatial transformation from the sensor coordinate frame to the manipulator base coordinate frame $S_0$. Placement of the sensor system relative to the manipulator is arbitrary, at least from the analytical point-of-view. The constant matrices $\bar{S}_i$ describe the kinematics of the manipulator in the signature configuration.

Figure 4:
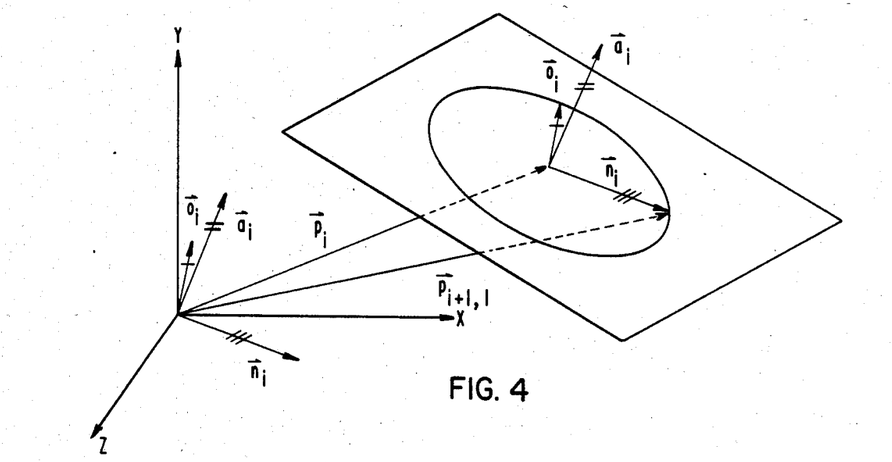
FIG. 4 is a schematic representation of a sensor coordinate frame identifying a plane of rotation therein.
Figure 5:
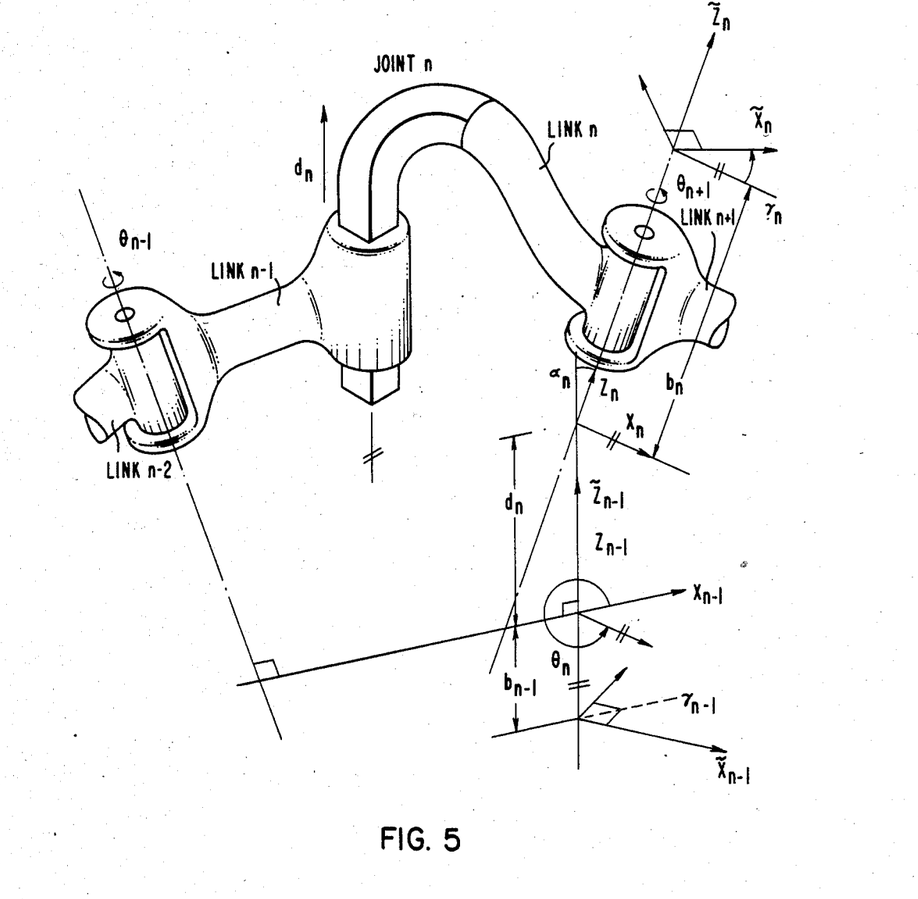
FIG. 5 is a schematic representation of a coordinate frame for a prismatic joint utilizing the S-Model of this invention.

In FIG. 4 we illustrate construction of $\bar{S}_i$ from the identified features. By definition $$\bar{S}_i = \begin{bmatrix} \vec{n}_i & \vec{o}_i & \vec{a}_i & \vec{p}_i \\ 0 & 0 & 0 & 1 \end{bmatrix}.$$

The unit direction vector $\vec{a}_i$ is the unit normal vector to the estimated plane-of-rotation of the $i+1^{th}$ joint. The unit direction vector $n_i$ is $$\vec{n}_i = \vec{p}_{i+1,1} - \vec{p}_{i+1,c} / |\vec{p}_{i+1,1} - \vec{p}_{i+1,c}| \quad (17)$$

where $\vec{p}_{i+1,1}$ is the location of the first target position for joint $i+1$ (projected onto the plane-of-rotation). For convenience, we use the first target position. The Y axis direction vector $\vec{o}_i$ is the cross product of the Z and X axis unit direction vectors $\vec{a}_i$ and $\vec{n}_i$, respectively. The origin of the link i coordinate frame $\vec{p}_i$ is the center-of-rotation $\vec{p}_{i+1,c}$. When computing $\vec{a}_i$ from the plane-of-rotation, the positive sense of $\vec{a}_i$ must correspond with the positive sense of rotation of the $i+1^{th}$ joint.

Model Parameters

In the third step, we compute the transformation matrices $B_i$ from the $\bar{S}_i$ matrices according to (3) and (15):

$$B_i = \bar{S}_{i-1}^{-1} \bar{S}_i \text{ for } i = 1, \ldots, n. \quad (18)$$

We then apply Paul's backward multiplication technique [6] to compute the six constant transformation matrix parameters, $\beta_i$, $\bar{d}_i$, $\bar{a}_i$, $\bar{\alpha}_i$, $\gamma_i$, and $b_i$ from $B_i$.

Denavit-Hartenberg Parameters

In the fourth and final step of our idenfitication algorithm, we extract the Denavit-Hartenberg parameters to model the kinematics of the manipulator over the entire joint space. We recognize that the physical position of a joint, as measured by the joint encoders, may not coincide with the value of the joint position ad defined in the Denavit-Hartenberg model. We denote the constant offset between these two measurements by $q_i^{offset}$. In terms of the signature configuration, $q_i^{offset}$ is $$q_i^{offset} = q_i^s - \bar{q}_i^s \quad (19)$$

where $\bar{q}_i^s$ is the encoder measured signature configuration position of joint i and $q_i^s$ is the corresponding Denvit-Hartenberg position of joint i computed according to (9) for a revolute joint or (10) for a prismatic joint. The Denavit-Hartenberg model parameters, $q_i = \theta_i$ for a revolute joint and $q_i = d_i$ for a prismatic joint, defined in (1) are thus $$q_i = \bar{q}_i + q_i^{offset}. \quad (20)$$

The parameters $\theta_i$ and $d_i$ are functions of the controllable and measureable position $\bar{q}_i$. With the exception of $\theta_i$ or $d_i$, the remaining $(3 \bullet n) - 1$ constant Denavit-Hartenberg parameters are computed according to (9)–(12).

The Denavit-Hartenberg parameters $\theta_1$ and $d_1$ are functions of the S-Model parameters $\gamma_0$ and $b_0$, respectively. In principle, $\gamma_0$ and $b_0$ can be computed from the elements of the matrix $B_0$. From (18), however, $B_0$ is undefined since neither $\bar{S}_{-1}$ nor equivalently $S_{-1}$ is defined in our identification algorithm. Fortunately, $\theta_1$ and $d_1$ are not essential for kinematic modeling and control of manipulators. We circumvent the problem by modifying the model in (1). We replace the matrix $T_n$ by $\bar{T}_n$ to represent the position and orientation of the $n^{th}$ link coordinate frame in terms of identified S-Model base coordinate frame $S_0$. To distinguish between the modified model and the original Denavit-Hartenberg model in (1), we express $\bar{T}_n$ as $$T_n = A_1 \bullet A_2 \bullet \ldots$$
$$\bullet A_n = [Rot(z, -\gamma_0) Trans(O, O, -b_0)] T_n \quad (21)$$

where the matrix $\bar{A}_1 = \bar{A}_1(\bar{q}_1)$ has the functional form of (2), and $A_i = A_i(\bar{q}_i)$ for $i = 2, \ldots, n$. We replace $q_1$ by $$\bar{\theta}_1 = \bar{q}_1 + (\beta_1 - \bar{q}_1^s) \quad (22)$$

for a revolute joint and $$d_1 = \bar{q}_1 + (\bar{d}_1 - \bar{q}_1{}^s) \quad (23)$$

for a prismatic joint. We call the model in (21) the psuedo Denavit-Hartenberg model. Even though the parameters $\gamma_n$ and $b_n$ are not required to formulate the pseudo Denavit-Hartenberg model in (21), we compute all of the S-Model parameters in the third step of our identification procedure. The parameters $\gamma_n$ and $b_n$ may be required to invert (21). In a subsequent paper, we will detail a general purpose algorithm to invert (21).

Implementation and Performance Evaluation

For kinematic identification, the manipulator is placed in an initial configuration, the signature configuration. A three dimensional cartesian range sensor is positioned relative to the base of the manipulator, as shown in FIG. 2 and described above. Measurements of the position of a target point for each link are gathered sequentially as each joint is actuated to define the features. From these measurements, the coefficients of the equations defining these features is estimated. The estimated coefficients are used (as outlined in Section 3.2.2) to compute the $\bar{S}_i$ matrices. For simplicity, we set $\bar{S}_n$ equal to $\bar{S}_{n-1}$. The $n^{th}$ link S-Model coordinate frame is thus defined to coincide with the $(n-1)^{th}$ link S-Model coordinate frame when joint n is in the signature configuration position. The matrices $B_i$ are computed according to (18). The matrices $B_i$ are functions of the S-Model parameters $\beta_i$, $\bar{d}_i$, $\bar{a}_i$, $\bar{\alpha}_i$, $b_i$, and $\gamma_i$ which are computed by Paul's backward multiplication method [6]. Finally, we extract the Denavit-Hartenberg parameters from the S-Model parameters according to (9)-(12). We then apply the identified pseudo Denavit-Hartenberg model to manipulator kinematic control.

S-Model identification can be used to obtain accurate models of the kinematic structures of all robotic manipulators with rigid links. We have implemented and applied our algorithm to identify the signatures of seven Unimation/Westinghouse Puma 560 robots. Such six degree-of-freedom robots with revolute joints are inherently sensitive to manufacturing errors, and it is a formidable task to characterize and compensate for these errors.

Ultrasonic range sensors were used to measure the three dimensional cartesian positions of the target. The software which controls the Puma 560 during the collection of the target positions and preprocesses these data is implemented on the Puma's Val II TM controller. The software which estimates the feature parameters and computes the signature parameters are written in the C programming language to run under the Unix TM operating system on a Digital Equipment Corporation VAX 780. The measurement data are thus collected by the VAL II controller and then uploaded to the VAX 780. Once identified, the arm signature is used to control the manipulator configuration in specified positioning tasks. A challenging task for analyzing the kinematic performance of a manipulator is the three-dimensional grid touching task. The Puma is initially taught three arbitrary points to define a workspace coordinate frame. During the task, the manipulator is programmed to position sequentially its end-effector at the vertices of a three dimensional grid defined with respect to the workspace coordinate frame. At each of the grid points, the actual position and orientation of the end-effector are measured. To obtain these measurements, we combine the Ranky sensor jig and Bridgeport milling machine. We mounted our sensor jig on the bed of a three-axis milling machine equipped with linear optical encoders. The jig can be displaced accurately over a large volume. The accuracy of our sensor jig is 0.001 inch in position and 0.01 degree in orientation. In the preliminary experimental results which follow, the grid size was 25 cm by 25 cm by 60 cm. Separate software, residing on the VAX 780, processes the grid touching measurement data and tabulates indices of kinematic performance.

The performance of the identification algorithm and the subsequent increase in manipulator kinematic performance are illustrated for two Unimation Puma 560 robots. The Denavit-Hartenberg parameters of the ideal kinematic model of a Puma 560 prior to manufacture are listed in Table 1 [8].

TABLE 1

Ideal Kinematic Parameters
Unimate Puma 560
Denavit-Hartenberg Kinematic Parameters

| Link | Variable | d (cm) | a (cm) | α (deg) |
|------|----------|--------|--------|---------|
| 1 | $\theta_1$ | 0.0 | 0.0 | −90.0 |
| 2 | $\theta_2$ | 14.909 | 43.18 | 0.0 |
| 3 | $\theta_3$ | 0.0 | −2.032 | 90.0 |
| 4 | $\theta_4$ | 43.07 | 0.0 | −90.0 |
| 5 | $\theta_5$ | 0.0 | 0.0 | 90.0 |
| 6 | $\theta_6$ | 0.0 | 0.0 | 0.0 |

In Table 2, we list the pseudo Denavit-Hartenberg parameters for the two Puma 560 robots identified by the

TABLE 2

Identified Arm Signature Parameters

| Link | Variable | $\theta_{offset}$ (deg) | d (cm) | a (cm) | α (deg) |
|------|----------|-------------------------|--------|--------|---------|
| Robot 1 | | | | | |
| 1 | $\theta_1$ | 110.308 | −20.678 | −0.005 | −90.066 |
| 2 | $\theta_2$ | 79.977 | 11210.213 | 7.607 | −0.217 |
| 3 | $\theta_3$ | −79.483 | −11194.978 | −2.039 | 90.519 |
| 4 | $\theta_4$ | −0.296 | 43.278 | −0.001 | −90.007 |
| 5 | $\theta_5$ | −0.497 | −0.018 | 0.002 | 89.990 |
| 6 | $\theta_6$ | −89.081 | 10.300 | 0.000 | 0.000 |
| Robot 2 | | | | | |
| 1 | $\theta_1$ | 110.849 | −20.428 | −0.023 | −90.013 |
| 2 | $\theta_2$ | 63.467 | 2783.580 | 19.084 | −0.803 |
| 3 | $\theta_3$ | −63.276 | −2768.574 | −2.028 | 90.134 |
| 4 | $\theta_4$ | −0.328 | 43.299 | −0.009 | −89.991 |
| 5 | $\theta_5$ | −0.126 | −0.054 | 0.007 | 89.969 |
| 6 | $\theta_6$ | −89.517 | 10.273 | 0.000 | 0.000 |

S-Model identification algorithm. The estimated values in Table 2 illustrate the sensitivity of the Denavit-Hartenberg parameters to small mechanical errors in the physical manipulator. For instance, the values of $d_2$ and $d_3$ in Table 2 indicate that the joint 2 and joint 3 axes are slightly out-of-parallel. The dramatic differences between the identified parameters and the ideal parameters arise from small manufacturing errors.

The grid touching task described above was performed twice by each of the two robots: with the ideal parameters and with the arm signature parameters. In Table 3, we summarize four measured indices by which we evaluate manipulator kinematic performance. This enhanced performance, along with the comparable improvement of the other five Puma 560s, indicate that the S-Model identification algorithm is a viable approach to identify the actual kinematics of manipulators and enhance their kinematic performance.

TABLE 3

Puma 560 Kinematic Performance Summary
Puma 560 Experimental Error Reduction Factor
[Performance with Arm Signature/Performance without Arm Signature]

| Description | Robot 1 | Robot 2 |
| --- | --- | --- |
| Maximum Normal Deviation from a Line | 4.6 | 7.7 |
| Deviation from Perpendicular between Grid Lines | 20.0 | 14.3 |
| Maximum Radial Deviation of Grid Point from Desired Location | 9.1 | 4.8 |
| Maximum Orientational Deviation of End-Effector from the Desired Orientation | 33.3 | 4.2 |

What has been described is a method for identifying kinematic parameters of an n-degree of freedom manipulator having n-links and n-joints.

I claim:

1. A method of identifying kinematic parameters of an n-degree of freedom manipulator having n-links and n-joints labeled link i and joint i for $i=1 \ldots n$, whereby the $n^{th}$ link is the link of the manipulator distal from the manipulator's base, and wherein controlled movement of said joints defines a manipulator work envelope; said method comprising the steps of:

(A) defining a reference cartesian coordinate frame of a predefined working volume;

(B) positioning said manipulator base in a fixed location relative to said reference coordinate frame wherein said manipulator work envelope is within said reference coordinate frame predefined working volume;

(C) completing for each joint of the robot beginning with the $n^{th}$ joint (i.e., $i=n$, until $i=1$) the following operations:

(a) defining a target relative to the $i^{th}$ link whereby incremental movement of the $i^{th}$ joint causes the synchronous movement of said target within said reference cartesian coordinate frame working volume;

(b) measuring a cartesian position of said target for each of a plurality of incremental movements of said $i^{th}$ joint whereby the resultant locus of measured cartesian positions defines a circle centered about the axis of rotation on a plane perpendicular to the axis of rotation, for a revolute joint; and a line parallel to the axis of translation for a prismatic joint;

(c) defining said plane on which said circle lies from said measured cartesian positions and the direction of a vector normal to said plane, said vector being parallel to the joint axis of rotation, for a revolute joint;

(d) defining the center of said circle which lies on said axis of rotation from said measured cartesian positions, for a revolute joint;

(e) detecting the line parallel to the line of translation, from said measured positions, for a prismatic joint;

(f) establishing the cartesian position and orientation of a cartesian coordinate frame fixed relative to the $i-1^{th}$ link of the manipulator measured with respect to said reference coordinate frame based upon said center of said circle and vector normal for a revolute $i^{th}$ joint, or line of translation for prismatic $i^{th}$ joint.

2. The method according to claim 1 wherein the reference cartesian coordinate frame of a predefined working volume is defined by a range sensor means having at least three sensor means disposed thereon for proving cartesian position information of the robot target.

3. A method of identifying kinematic parameters of an n-degree of freedom manipulator having n-links and n-joints labeled link i and joint i for $i=1 \ldots n$, whereby the $n^{th}$ link is the link of the manipulator distal from the manipulator's base, and wherein controlled movement of said joints defines a manipulator work envelope; said method comprising the steps of:

(A) defining a reference cartesian coordinate frame of a predefined working volume;

(B) positioning said manipulator base in a fixed location relative to said reference coordinate frame wherein said manipulator work envelope is within said reference coordinate frame predefined working volume;

(C) completing for each joint of the robot beginning with the $n^{th}$ joint (i.e., $i=n$, until $i=1$) the following operations:

(a) defining a target relative to the $i^{th}$ link whereby incremental movement of the $i^{th}$ joint causes the synchronous movement of said target within said reference cartesian coordinate frame working volume;

(b) measuring a cartesian position of said target for each of a plurality of incremental movements of said $i^{th}$ joint whereby the resultant locus of measured cartesian positions defines a circle centered about the axis of rotation on a plane perpendicular to the axis of rotation, for a revolute joint;

(c) defining said plane on which said circle lies from said measured cartesian positions and the direction of a vector normal to said plane, said vector being parallel to the joint axis of rotation, for a revolute joint;

(d) defining the center of said circle which lies on said axis of rotation from said measured cartesian positions, for a revolute joint; and (e) establishing the cartesian position and orientation of a cartesian coordinate frame fixed relative to the $i-1^{th}$ link of the manipulator measured with respect to said reference coordinate frame based upon said center of said circle and vector normal for a revolute $i^{th}$ joint.

4. The method according to claim 3 wherein the reference cartesian coordinate frame of a predefined working volume is defined by a range sensor means having at least three sensor means disposed thereon for proving cartesian position information of the robot target.

5. A method of identifying kinematic parameters of an n-degree of freedom manipulator having n-links and n-joints labeled link i and joint i for $i=1 \ldots n$, whereby the $n^{th}$ link is the link of the manipulator distal from the manipulator's base, and wherein controlled movement of said joints defines a manipulator work envelope; said method comprising the steps of:

(A) defining a reference cartesian coordinate frame of a predefined working volume;

(B) positioning said manipulator base in a fixed location relative to said reference coordinate frame wherein said manipulator work envelope is within said reference coordinate frame predefined working volume;

(C) completing for each joint of the robot beginning with the $n^{th}$ joint (i.e., i=n, until i=1) the following operations:

(a) defining a target relative to the $i^{th}$ link whereby incremental movement of the $i^{th}$ joint causes the synchronous movement of said target within said reference cartesian coordinate frame working volume;

(b) measuring a cartesian position of said target for each of a plurality of incremental movements of said $i^{th}$ joint whereby the resultant locus of measured cartesian positions defines a line parallel to the axis of translation for a prismatic joint;

(c) detecting the line parallel to the line of translation, from said measured positions, for a prismatic joint;

(d) establishing the cartesian position and orientation of a cartesian coordinate frame fixed relative to the $i-1^{th}$ link of the manipulator measured with respect to said reference coordinate frame based upon said center of said circle and vector normal for a revolute $i^{th}$ joint, or line of translation for prismatic $i^{th}$ joint.

6. The method according to claim 5 wherein the reference cartesian coordinate frame to a predefined working volume is defined by a range sensor means having at least three sensor means disposed thereon for proving cartesian position information of the robot target.

* * * * *